(12) United States Patent
Tanaka et al.

(10) Patent No.: US 6,758,381 B2
(45) Date of Patent: Jul. 6, 2004

(54) PINCH ROLLER DEVICE

(75) Inventors: Shinji Tanaka, Kyoto (JP); Akio Konishi, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/142,268

(22) Filed: May 9, 2002

(65) Prior Publication Data

US 2002/0175199 A1 Nov. 28, 2002

(30) Foreign Application Priority Data

May 25, 2001 (JP) ........................................ 2001-156555

(51) Int. Cl.[7] .......................... B65H 20/00; B61F 15/02; F16C 33/18
(52) U.S. Cl. ...................... 226/194; 226/180; 384/192; 384/297; 384/909
(58) Field of Search .................................. 226/194, 190, 226/180; 384/192, 297, 299, 300, 908, 909, 202

(56) References Cited

U.S. PATENT DOCUMENTS

| | | | | |
|---|---|---|---|---|
| 3,907,234 A | * | 9/1975 | Sato et al. ................ | 242/326.4 |
| 3,967,769 A | * | 7/1976 | Matsumoto ................. | 226/194 |
| 5,373,982 A | * | 12/1994 | Takahashi ................... | 226/194 |
| 5,452,833 A | * | 9/1995 | Hutter ........................ | 226/194 |
| 5,626,273 A | * | 5/1997 | Fell ........................... | 242/615.2 |
| 5,788,137 A | * | 8/1998 | Ku ............................. | 226/194 |
| 5,820,010 A | * | 10/1998 | Takahashi et al. .......... | 226/190 |
| 5,896,240 A | * | 4/1999 | Yamazaki et al. ........... | 360/90 |
| 5,934,538 A | * | 8/1999 | Hirose et al. ............... | 226/194 |
| 6,467,669 B1 | * | 10/2002 | Okada ......................... | 226/194 |
| 6,602,142 B2 | * | 8/2003 | Tone et al. ................. | 464/111 |

\* cited by examiner

*Primary Examiner*—Kathy Matecki
*Assistant Examiner*—Evan H Langdon
(74) *Attorney, Agent, or Firm*—Renner, Otto, Boisselle & Sklar, LLP

(57) ABSTRACT

A pinch roller device for running the tape includes a rotatable hollow cylindrical elastic member; a sleeve for holding the elastic member; a bearing integrated with the sleeve; a pinch roller shaft for rotatably supporting the bearing, which has an effective bearing face for receiving a force from the pinch roller shaft; an inclination restriction member for restricting an inclination angle of the pinch roller shaft; first and second position restriction members for respectively restricting a position of the elastic member in first and second thrusting directions; and a sliding restriction member having a circular cross-section along a plane perpendicular to a rotation center line of the elastic member and disposed at a different portion from the effective bearing face. When an angle between the rotation center lines of the elastic member and the pinch roller shaft approaches a prescribed value, the sliding restriction member contacts the inclination restriction member.

13 Claims, 14 Drawing Sheets

PINCH ROLLER DEVICE

BACKGROUND OF THE INVENTION

1. Field of the Invention

The present invention relates to a pinch roller device used in a magnetic recording and reproduction apparatus such as a video tape recorder.

2. Description of the Related Art

Recently, there has been a strong demand for more compact, lightweight and lower-cost video tape recorders integrated with cameras. In order to fulfill such demand, it is important to improve the structure of a tape driving device which is included in such recorders and that includes a pinch roller device.

FIG. 15 is a cross-sectional view of a conventional pinch roller device 150. The pinch roller device 150 includes a rotatable capstan shaft 1, a metal sleeve 22, an elastic member 3 formed of rubber, for example, and fixed on an outer circumferential surface of the metal sleeve 22, and a bearing 11 having collars 13. The bearing 11 and the sleeve 22 are integrated together by the collars 13 being pressure-inserted into an inner circumferential surface of the sleeve 22. The pinch roller device 150 further includes a pinch roller shaft 5 for rotatable supporting the bearing 11, and a pinch arm 9 for carrying the pinch roller shaft 5 projecting therefrom. The bearing 11 has an effective bearing face 12 for receiving a force from the pinch roller shaft 5 applied in a radial direction of the pinch roller shaft 5. The bearing 11, the metal sleeve 22, the collars 13 and the elastic member 3 form an assembly 50. The pinch roller shaft 5 is provided therearound with a first position restriction member 7 having a restriction surface 7a for restricting movement of the elastic member 3 in an upward thrust direction (arrow N), and a second position restriction member 8 having a restriction surface 8a for restricting movement of the elastic member 3 in a downward thrust direction (arrow N). Reference numeral 10 represents a tape used for data recording and reproduction.

In the pinch roller device 150 having the above-described structure, the tape 10 runs at a prescribed speed by putting the tape 10 into pressure-contact with the capstan shaft 1 by the elastic member 3 while rotating the capstan shaft 1.

In order to stably run the tape 10, the elastic member 3 needs to press the tape 10 uniformly toward the capstan shaft 1, preferably in the state where the capstan shaft 1 and the pinch roller shaft 5 are parallel to each other. However, for reasons related to the production process, it is inevitable that the pinch roller shaft 5 slightly inclines with respect to the capstan shaft 1. Therefore, it is difficult to dispose the pinch roller shaft 5 and the capstan shaft 1 completely parallel to each other.

FIG. 16 is an enlarged partial view of the pinch roller device 150, illustrating the pinch roller shaft 5 and the vicinity thereof. As shown in FIG. 16, the pinch roller shaft 5 and the effective bearing face 12 of the bearing 11 have a gap therebetween having a size LD in a radial direction of the bearing 11. Using this gap, the elastic member 3 is inclined with respect to the assembly 50 (FIG. 15), so that the pinch roller shaft 5 is parallel to the capstan shaft 1. More specifically, a rotation center line 11a of the bearing 11 is inclined with respect to a rotation center line 5a of the pinch roller shaft 5 at angle θ in a direction in which the elastic member 3 presses the tape 10 toward the capstan shaft 1 (represented by arrow M). In this manner, the elastic member 3 can uniformly pressure the tape 10 toward the capstan shaft 1. Herein, the direction of arrow M is also referred to as a "tape thickness direction".

The conventional pinch roller device 150 has the following problems.

(1) When the size LD of the gap between the effective bearing face 12 and the pinch roller shaft 5 is larger, the freedom in angle θ is also larger. This is preferable in order to accommodate an error in the angle of inclination of the pinch roller shaft 5 with respect to the capstan shaft 1 caused in the production process and thus guarantee stable running of the tape 10.

However, when the size LD is too large, the angle of inclination of the rotation center line 11a with respect to the rotation center line 5a in a tape running direction (perpendicular to the sheet of FIG. 16) is also increased. This is undesirable for the following reason. In general, when the running direction of the tape 10 is changed from forward to reverse or from reverse to forward, the direction of inclination of the elastic member 3 with respect to the capstan shaft 1 is reversed. Where the angle of inclination of the rotation center line 11a (i.e., the angle of inclination of the elastic member 3) with respect to the rotation center line 5a in the tape running direction is too large, the height of the tape 10 with respect to the surface of the capstan shaft 1 rapidly changes when the running direction of the tape 10 is changed. This can damage the tape 10 or cause unstable running of the tape 10. Therefore, in the running direction of the tape 10, the size LD of the gap preferably has a minimum possible size.

Accordingly, the size LD of the gap needs to be appropriately set so that the angle of inclination of the rotation center line 11a with respect to the rotation center line 5a in both of the above-mentioned two directions, is in a range which guarantees stable running of the tape 10. In order to satisfy such contradicting requirements, the variation in the size LD needs to be reduced and an effective length LB of the effective bearing face 12 in the thrust direction needs to be sufficiently large.

In order to reduce the variation in the size LD, the size precision of the components of the pinch roller device 150 needs to be strictly controlled. In addition, when the effective length LB is larger, the distance from the center of the effective bearing surface 12 in the thrust direction to the contact point between the pinch roller shaft 5 and the effective bearing face 12 is longer. This makes it difficult to put the elastic member 3 into uniform pressure-contact with the capstan shaft 1. This is also undesirable to guarantee stable running of the tape 10.

(2) The collars 13 are required in order to secure the bearing 11 inside the sleeve 22. Since the collars 13 need to be reduced in thickness in order to reduce the size of the pinch roller device 150, the collars 13 are usually formed of metal. When the metal collars 13 are pressure-inserted into an inner circumference of the sleeve 22, the collars 13 may undesirably become fixed in the thrust direction while being in contact with the bearing 11. In this state, the collars 13 may deform the bearing 11.

(3) As shown in FIG. 15, the assembly of the pinch roller shaft 5, the first position restriction member 7 and the second position restriction member 8 has a stepped structure. The restriction surface 8a, which is slidably engaged with the bearing 11, needs to be highly smooth in order to reduce friction resistance upon the bearing 11. However, due to the stepped shape of the assembly, the restriction surface 8a cannot be smoothed by a low-cost smoothing technique, such as, for example, centerless polishing. This increases the production cost of the pinch roller shaft 5.

SUMMARY OF THE INVENTION

A pinch roller device for putting a tape into pressure-contact with a capstan shaft for running the tape includes a hollow cylindrical elastic member rotating while the tape is running; a sleeve provided on an inner surface of the elastic member for holding the elastic member; a bearing integrated with the sleeve; a pinch roller shaft inserted through the bearing for rotatably supporting the bearing: an inclination restriction member integrated with the pinch roller shaft for restricting an angle of inclination of the pinch roller shaft with respect to the elastic member; a first position restriction member integrated with the pinch roller shaft to be inside the elastic member for restricting a position of the elastic member in a first thrusting direction of the elastic member; a second position restriction member integrated with the pinch roller shaft to be inside the elastic member for restricting a position of the elastic member in a second thrusting direction of the elastic member; and a sliding restriction member integrated with the sleeve and having a circular cross-section along a plane perpendicular to a rotation center line of the elastic member. The bearing has an effective bearing face in contact with an outer circumferential surface of the pinch roller shaft for receiving a force applied from the pinch roller shaft in a radial direction of the pinch roller shaft. The sliding restriction member is disposed at a different portion from the effective bearing face. When an angle between the rotation center line of the elastic member and a rotation center line of the pinch roller shaft approaches a prescribed value, the sliding restriction member contacts the inclination restriction member.

Therefore, the angle between the rotation center line of the elastic member and the rotation center line of the pinch roller shaft can be maintained in a prescribed range.

In one embodiment of the invention, one of the first position restriction member and the second position restriction member is integrated with the inclination restriction member.

In one embodiment of the invention, the inclination restriction member is formed of a resin material and pressure-inserted into the pinch roller shaft.

Therefore, the inclination restriction member can be produced easily and at low cost.

In one embodiment of the invention, the sliding restriction member has a cylindrical inner surface, the inner surface having a roughness equal to or less than 3 $\mu$m, and is pressure-inserted into the sleeve.

Therefore, the sliding restriction member can be produced easily and at low cost.

In one embodiment of the invention, the inclination restriction member is produced of an identical material as that of the pinch roller shaft as a result of partially enlarging the diameter of the pinch roller shaft.

In one embodiment of the invention, the pinch roller shaft projects from a pinch arm for supporting the pinch roller shaft, and a portion of the pinch arm acts as the inclination restriction member.

In one embodiment of the invention, the pinch arm is formed of a resin material, and the inclination restriction member is formed integrally with and of the same resin material.

Therefore, the inclination restriction member can be produced easily and at low cost.

In one embodiment of the invention, a cross-section of the inclination restriction member along a plane perpendicular to a rotation center line of the pinch roller shaft has a portion which extends radially outward from a perfect circle, and the portion extending radially outward is contactable with the sliding restriction member.

Therefore, the angle between the rotation center line of the bearing and the rotation center line of the pinch roller shaft can be adjusted in accordance with the angle of inclination of the bearing.

In one embodiment of the invention, $\theta A > \theta S$ where $\theta A$ is an angle between the rotation center line of the elastic member and the rotation center line of the pinch roller shaft in a tape thickness direction when the inclination restriction member contacts the sliding restriction member, and $\theta S$ is an angle between the rotation center line of the elastic member and the rotation center line of the pinch roller shaft in a tape running direction when the inclination restriction member contacts the sliding restriction member.

Therefore, the angle between the rotation center line of the bearing and the rotation center line of the pinch roller shaft when the inclination restriction member contacts the sliding restriction member in the tape thickness direction can be set to a maximum possible value, and the above-mentioned angle in the tape running direction can be set to a minimum possible value, separately from the angle in the tape thickness direction.

In one embodiment of the invention, the bearing is pressure-inserted into the sleeve so as to be fixed.

Therefore, the bearing can be produced easily and at low cost.

In one embodiment of the invention, the elastic member is engaged with the sleeve and held by projections provided along top and bottom perimeters of the sleeve so as not to come off from the sleeve.

Therefore, the sleeve and the elastic member can be integrated easily and at low cost.

In one embodiment of the invention, the sleeve and the bearing are integrated together and formed of an identical material.

Therefore, the sleeve and the bearing can be integrated easily and at low cost.

In one embodiment of the invention, $LB < 0.3\ LG$ where LB represents a length of the effective bearing face in the direction of the rotation center line of the elastic member and LG represents a length of the elastic member in the direction of the rotation center line of the elastic member.

Therefore, the tape can run stably.

Thus, the invention described herein makes possible the advantages of providing a highly reliable pinch roller device providing high performance for stably running the tape.

These and other advantages of the present invention will become apparent to those skilled in the art upon reading and understanding the following detailed description with reference to the accompanying figures.

DESCRIPTION OF THE PREFERRED EMBODIMENTS

Figure 1:
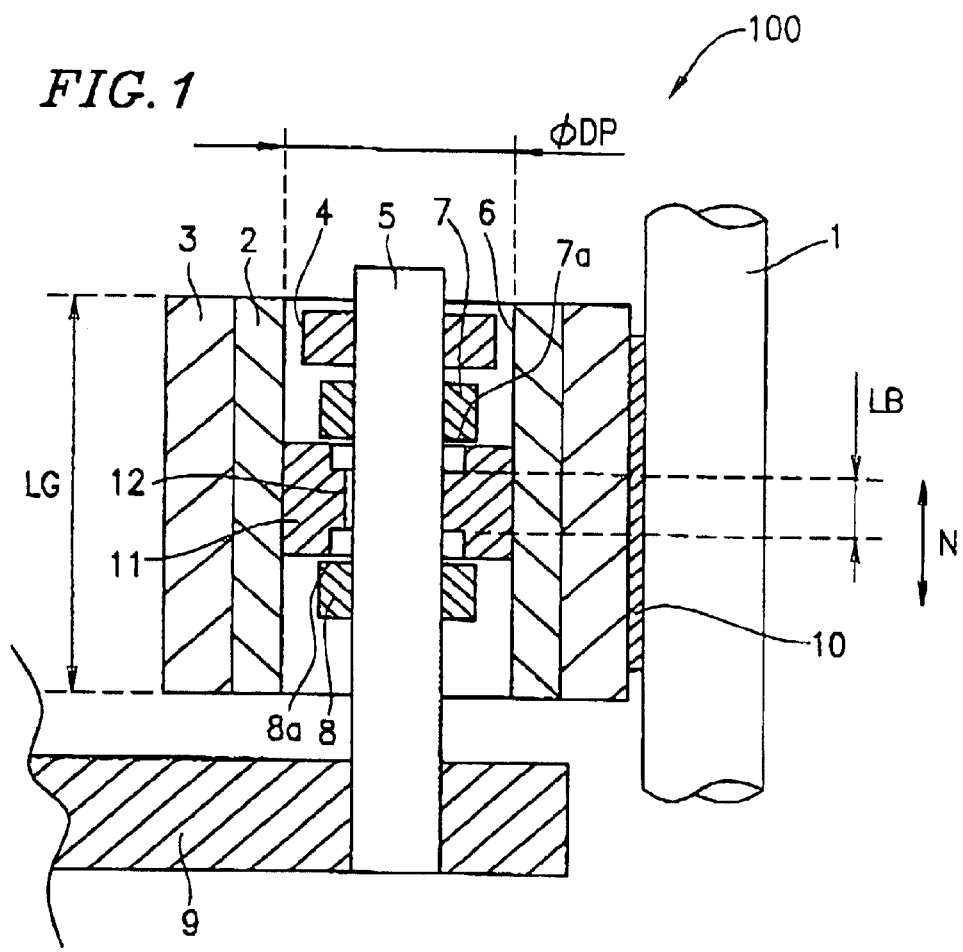
FIG. 1 is a cross-sectional view of a pinch roller device according to the present invention.

Hereinafter, the present invention will be described by way of illustrative examples with reference to the accompanying drawings. Identical elements in different examples bear identical reference numerals.

Figure 15:
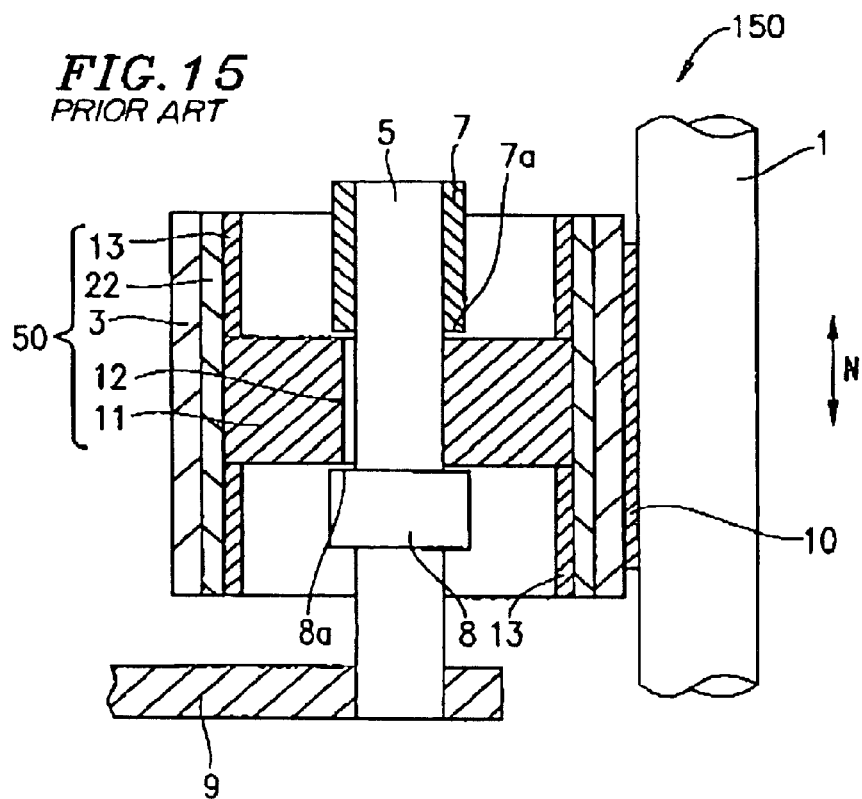
FIG. 15 is a cross-sectional view of a conventional pinch roller device.

FIG. 1 is a cross-sectional view of a pinch roller device 100 according to an example of the present invention. Identical elements previously discussed with respect to FIG. 15 bear identical reference numerals and the detailed descriptions thereof will be omitted.

The pinch roller device 100 includes a rotatable capstan shaft 1, a metal sleeve 2, an elastic member 3 formed of rubber, for example, and fixed on an outer circumferential surface of the metal sleeve 2, a bearing 11, and a pinch roller shaft 5 for rotatably supporting the bearing 11. The bearing 11 and the sleeve 2 are integrated together. The bearing 11 has an effective bearing face 12 for receiving a force applied from the pinch roller shaft 5 in a radial direction of the pinch roller shaft 5. The pinch roller shaft 5 has a first position restriction member 7 having a restriction surface 7a for restricting movement of the elastic member 3 in an upward thrust direction (arrow N), and a second position restriction member 8 having a restriction surface 8a for restricting movement of the elastic member 3 in a downward thrust direction (arrow N). The pinch roller device 100 further includes an annular inclination restriction member 4 integrated with the pinch roller shaft 5. An inner circumferential surface of the sleeve 2 acts as a sliding restriction member 6. The sliding restriction member 6 has a circular cross-section along a plane perpendicular to a rotation center line 11a (FIG. 2) of the bearing 11 (i.e., a rotation center line of the elastic member 3). The sliding restriction member 6 presents a smooth surface along which the inclination restriction member 4 may slide freely if in contact with the sliding restriction member 6. Reference numeral 10 represents a tape used for data recording and reproduction.

Figure 2:
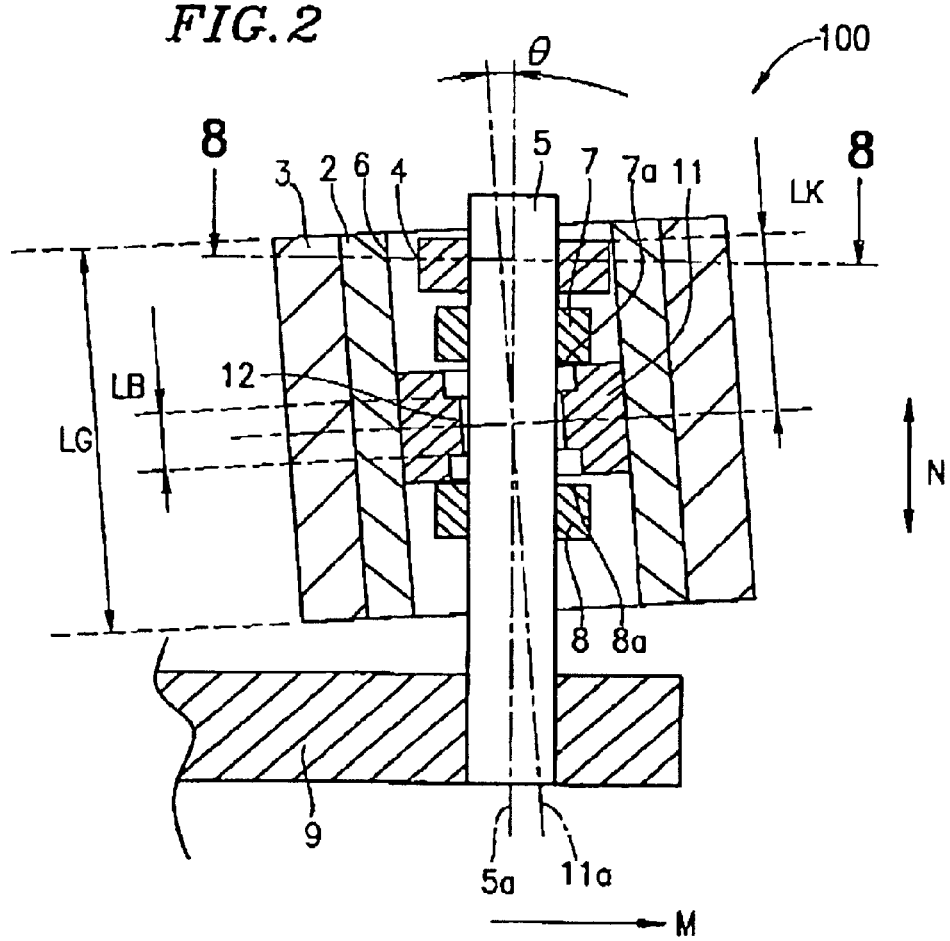
FIG. 2 is a partial cross-sectional view of a pinch roller device according to the present invention.

With reference to FIG. 2, LK represents a distance from the center of the effective bearing surface 12 in the direction of the center line 11a of the bearing 11 to the contact point between the inclination restriction member 4 and the sliding restriction member 6. LB represents an effective length of the effective bearing face 12 in the direction of the center line 11a. In the pinch roller device 100 in this example, LK and LB are set so as to fulfill expression (1).

$$LK > LB \qquad (1).$$

Therefore, if the angle θ between a rotation center line 11a of the bearing 11 and a rotation center line 5a of the pinch roller shaft 5 approaches a prescribed value, the inclination restriction member 4 contacts the sliding restriction member 6 as represented in FIG. 2.

Figure 16:
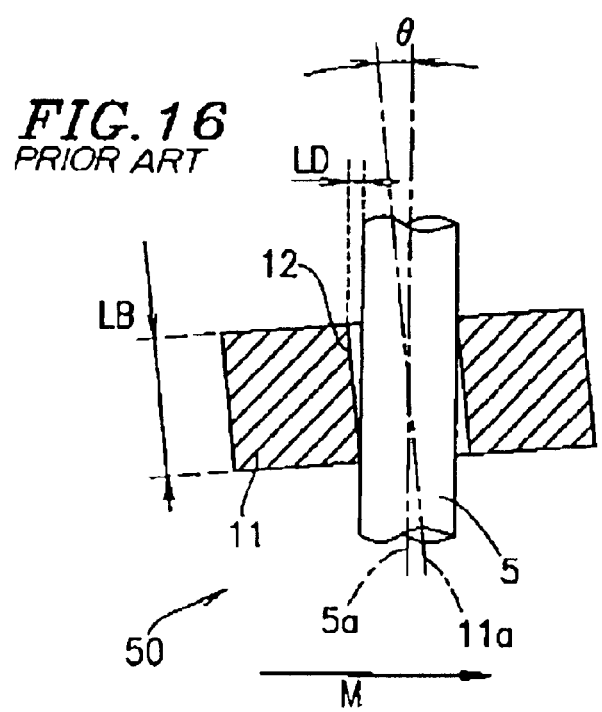
FIG. 16 is a partial cross-sectional view of a conventional pinch roller device shown in FIG. 15.

Due to such structure, the angle between a rotation center line 11a of the bearing 11 and a rotation center line 5a of the pinch roller shaft 5 both in the tape thickness direction M and in the tape running direction (perpendicular to the sheet of FIG. 2) can be easily maintained in a prescribed range simply by controlling the size relationship of LK and LB. The strict control of the size LD as required by the conventional pinch roller device 150 (FIGS. 15 and 16) is not necessary.

In the example shown in FIG. 1, the relationship of LK>LB is fulfilled. The pinch roller device 100 shown in FIG. 1 also fulfills the relationship of:

$$LB < 0.3 \, LG \qquad (2)$$

where LG represents the total length of the elastic member 3 in the direction of the center line 11a (FIG. 2). The present inventors have experimentally confirmed that the running of the tape 10 is superbly stable.

Figure 3:
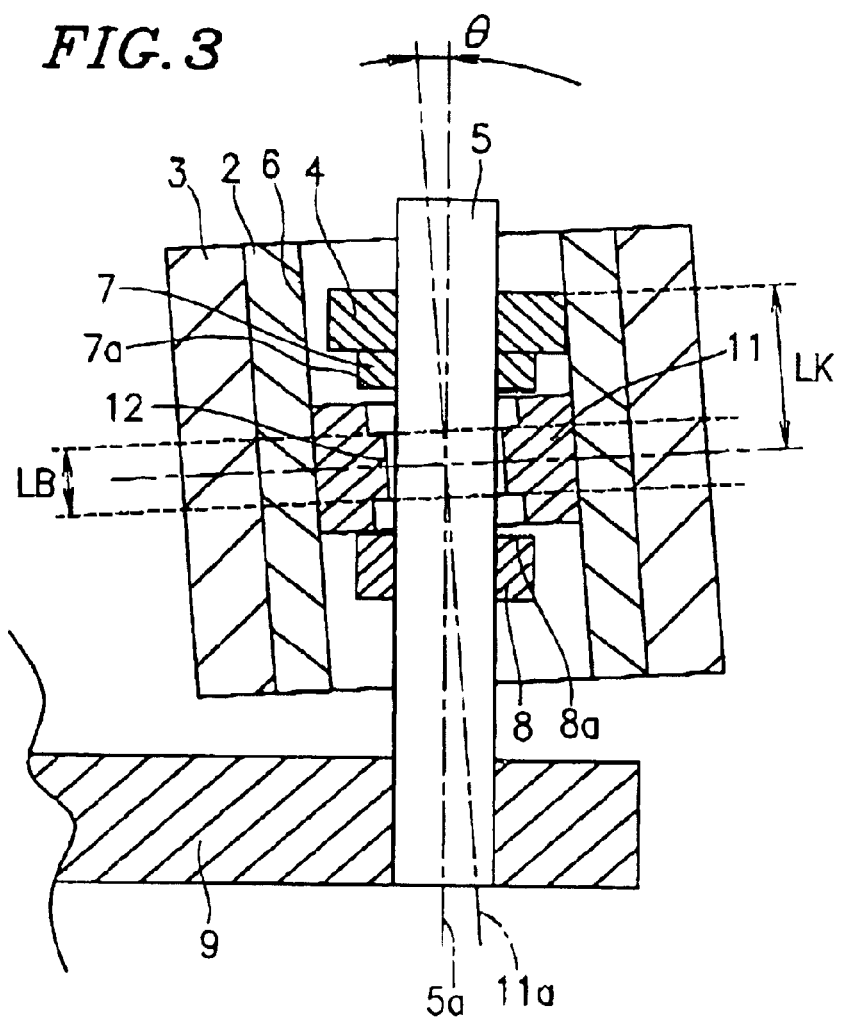
FIG. 3 is a partial cross-sectional view illustrating a structure modified from the pinch roller device shown in FIG. 1.

FIG. 3 is a cross-sectional view of a pinch roller device having a structure modified from the pinch roller device 100 shown in FIG. 1. The inclination restriction member 4 and the first position restriction member 7 are integrated together. The pinch roller device having such a structure is easy to assemble and is produced easily and at lower cost with fewer elements. The pinch roller device shown in FIG. 3 fulfills LK>LB like the pinch roller device 100 shown in FIG. 1 and thus provides substantially the same effect as that of the pinch roller device 100.

Figure 4:
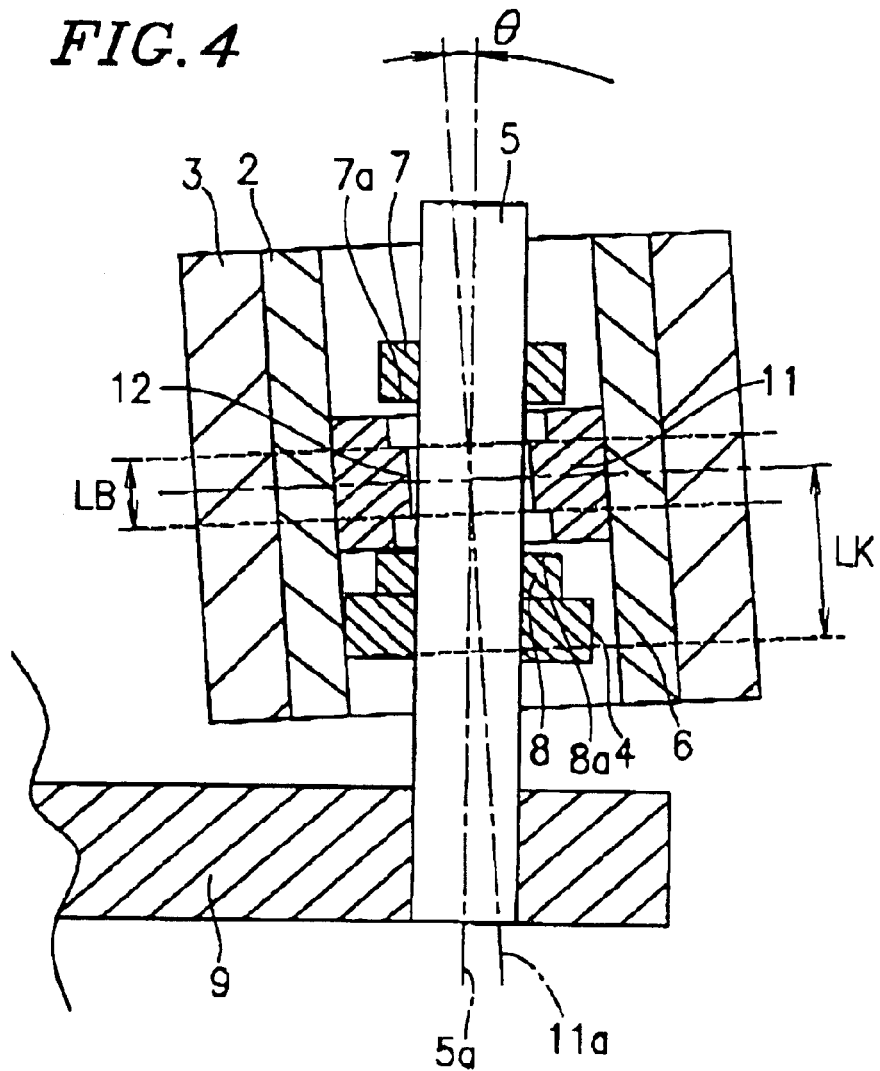
FIG. 4 is a partial cross-sectional view illustrating a structure modified from the pinch roller device shown in FIG. 1.

FIG. 4 is a cross-sectional view of a pinch roller device having another structure modified from the pinch roller device 100 shown in FIG. 1. The inclination restriction member 4 and the second position restriction member 8 are integrated together. The pinch roller device having such a structure is easy to assemble and is produced easily and at lower cost with fewer elements. The pinch roller device shown in FIG. 4 fulfills LK>LB like the pinch roller device 100 shown in FIG. 1 and thus provides substantially the same effect as that of the pinch roller device 100.

Figure 5:
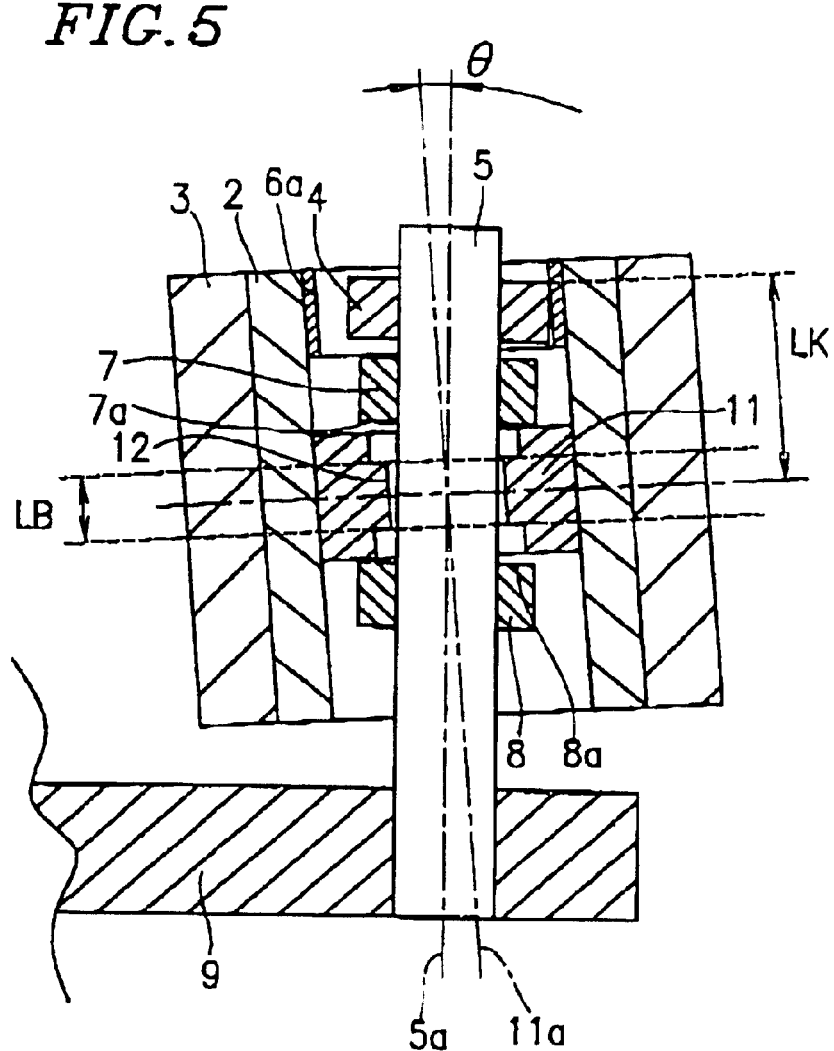
FIG. 5 is a partial cross-sectional view illustrating a structure modified from the pinch roller device shown in FIG. 1.

FIG. 5 is a cross-sectional view of a pinch roller device having still another structure modified from the pinch roller device 100 shown in FIG. 1. A sliding restriction member 6a is pressure-inserted into an inner circumferential surface of the sleeve 2. The sliding restriction member 6a is hollow and cylindrical and has a surface roughness Ry equal to or less than 3 μm. The pinch roller device shown in FIG. 5 fulfills LK>LB like the pinch roller device 100 shown in FIG. 1 and thus provides substantially the same effect as that of the pinch roller device 100.

In FIG. 5, the inclination restriction member 4 slides against the sliding restriction member 6a. The inclination restriction member 4 in this embodiment as well as other embodiments discussed herein may be formed of a material having a relatively low rigidity such as, for example, a resin material, and the sliding restriction member 6a may be formed of a material having a relatively high rigidity such as, for example, metal. When the inclination restriction member 4 slides against the sliding restriction member 6a, the inclination restriction member 4 may be significantly abraded and generate abrasion powder or the like. By setting the surface roughness Ry of the sliding restriction member 6a to equal to or less than 3 μm as in this example, the abrasion of the inclination restriction member 4 is alleviated. This has been confirmed by experiments performed by the present inventors as shown in FIG. 14.

Figure 14:
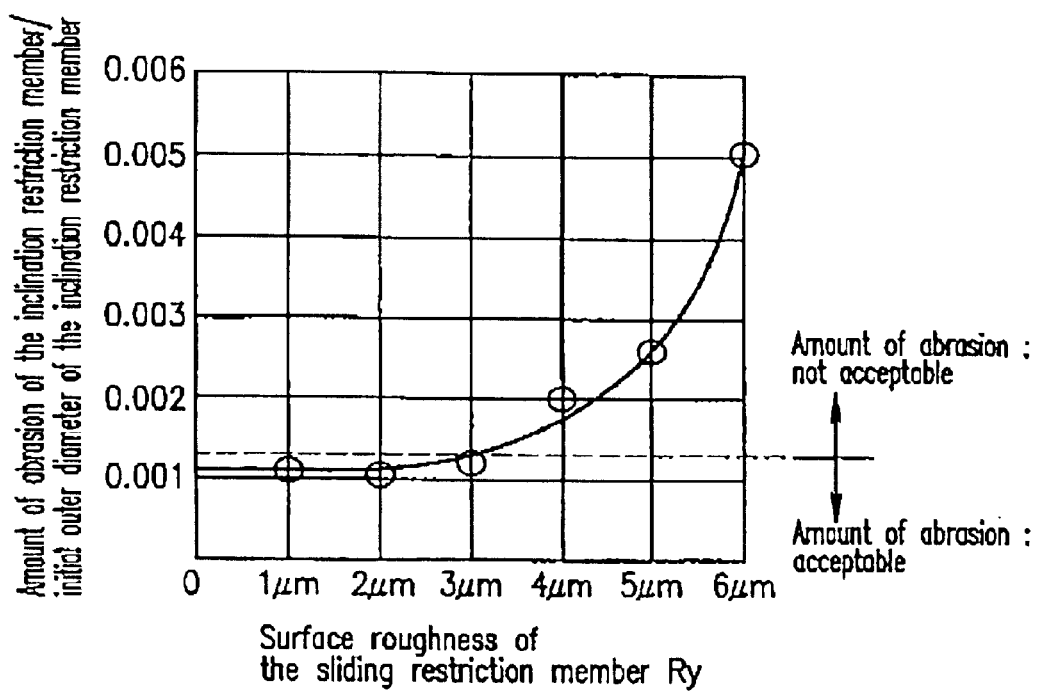
FIG. 14 is a graph illustrating the relationship between the surface roughness Ry of the sliding restriction member, and the ratio of the amount of abrasion of the inclination restriction member relative to the initial outer diameter of the inclination restriction member.

FIG. 14 is a graph illustrating the relationship between the surface roughness Ry of the sliding restriction member, and the ratio of the amount of abrasion of the inclination restriction member relative to the initial outer diameter of the inclination restriction member. It is appreciated from FIG. 14, when the surface roughness Ry of the sliding restriction member exceeds 3 μm, the amount of abrasion of the inclination restriction member significantly increases. When the surface roughness Ry of the sliding restriction member is equal to or less than 3 μm, the inclination restriction member is not substantially abraded and has a smooth surface.

Due to such a structure, the inclination restriction member 4 shown in FIG. 5 has a longer life and a higher level of reliability than the inclination restriction member 4 shown in each of FIGS. 1, 3 and 4.

In FIG. 5, for example, the pinch roller shaft 5 may be pressure-inserted into the inclination restriction member 4. The pinch roller device shown in FIG. 5 fulfills LK>LB like the pinch roller device 100 shown in FIG. 1 and thus provides substantially the same effect as that of the pinch roller device 100.

Figure 6:
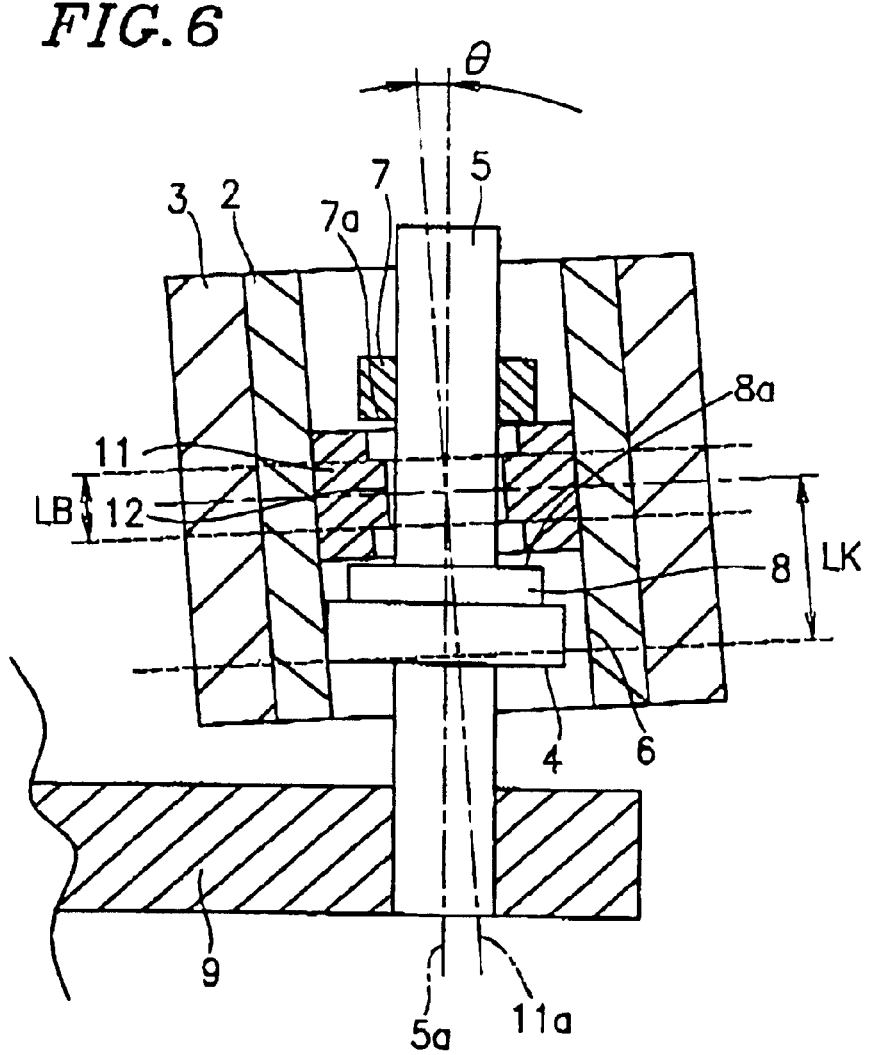
FIG. 6 is a partial cross-sectional view illustrating a structure modified from the pinch roller device shown in FIG. 4.

FIG. 6 is a cross-sectional view of a pinch roller device having still another structure modified from the pinch roller device shown in FIG. 4. As in FIG. 4, the inclination restriction member 4 is integral with the second position restriction member 8. The pinch roller device shown in FIG. 6 is different from the pinch roller device shown in FIG. 4 in that the inclination restriction member 4 and the second position restriction member 8 are formed integrally with and of the same material as that of the pinch roller shaft 5, and as a consequence, the pinch roller shaft 5 has a larger diameter in the portions corresponding to the inclination restriction member 4 and the second position restriction member 8 than in the rest of the pinch roller shaft 5. The pinch roller device having such a structure is easy to assemble and is produced easily and at lower cost. The pinch roller device shown in FIG. 6 fulfills LK>LB like the pinch roller device 100 shown in FIG. 1 and thus provides substantially the same effect as that of the pinch roller device 100.

In the pinch roller device shown in FIG. 6, the inclination restriction member 4 and the second position restriction member 8 are integrally formed with the pinch roller shaft 5, but the present invention is not limited to this. For example, the inclination restriction member 4 may be integrally formed with the first position restriction member 7 and the pinch roller shaft 5. Alternatively, the inclination restriction member 4 and the pinch roller shaft 5 may be integrated together.

Figure 7:
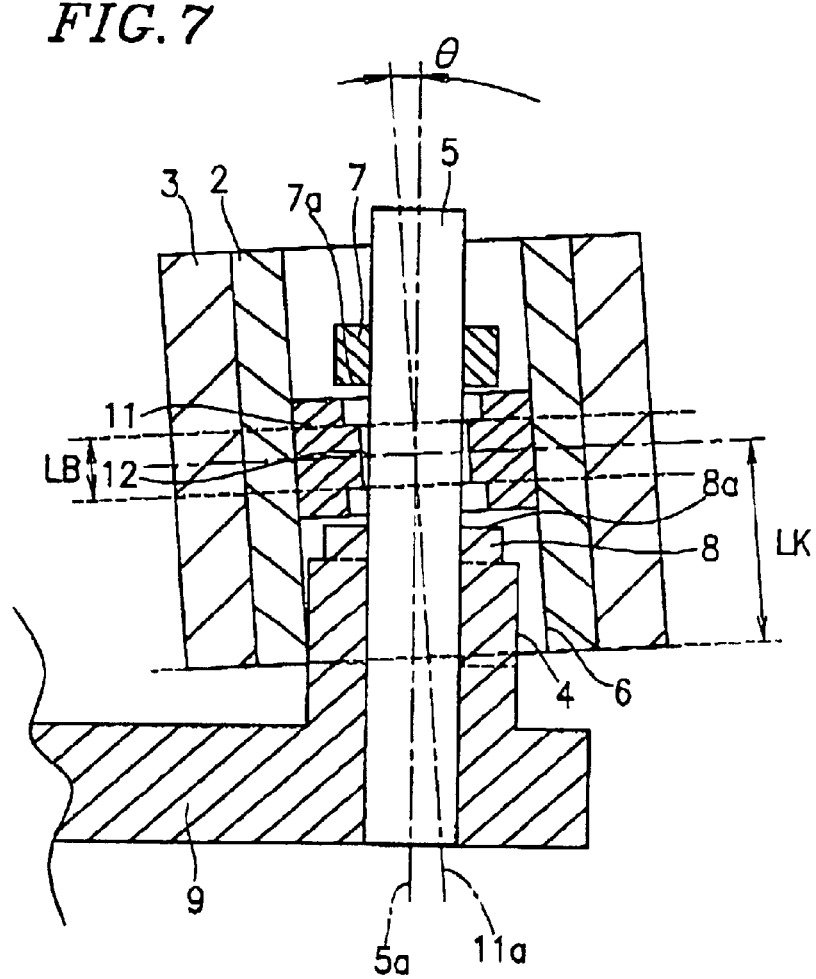
FIG. 7 is a partial cross-sectional view illustrating a structure modified from the pinch roller device shown in FIG. 1.

FIG. 7 is a cross-sectional view of a pinch roller device having still another structure modified from the pinch roller device 100 shown in FIG. 1. A part of the pinch arm 9 for carrying the pinch roller shaft 5 projecting therefrom acts as the inclination restriction member 4 and the second position restriction member 8. The pinch roller device having such a structure is easy to assemble and is produced easily and at lower cost. The pinch arm 9, the inclination restriction member 4 and the second position restriction member 8, as a part of the pinch arm 9, may be formed of a resin. The pinch roller device shown in FIG. 7 fulfills LK>LB like the pinch roller device 100 shown in FIG. 1 and thus provides substantially the same effect as that of the pinch roller device 100.

Figure 8:
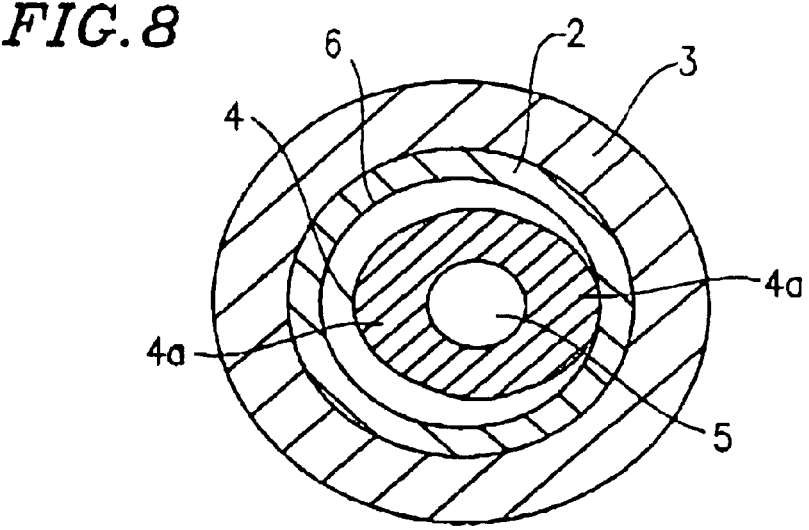
FIG. 8 is a cross-sectional view illustrating a structure modified from the pinch roller device shown in FIG. 2, taken along line C—C of FIG. 2.

FIG. 8 is a top cross-sectional view of a pinch roller device having still another structure modified from the pinch roller device 100 shown in FIG. 1 taken along a line corresponding to line C—C of FIG. 2. The cross-section of the inclination restriction member 4, taken along a plane which is perpendicular to the rotation center line 5a (FIG. 2) of the pinch roller shaft 5, has portions 4a which extend radially outward from an otherwise perfect circle so as to be elliptical. The portions 4a can contact the sliding restriction member 6. Namely, the angle between the rotation center line 11a (FIG. 2) of the bearing 11 and the rotation center line 5a of the pinch roller shaft 5 can be controlled in accordance with the angle and the direction of inclination of the bearing 11.

Figure 9:
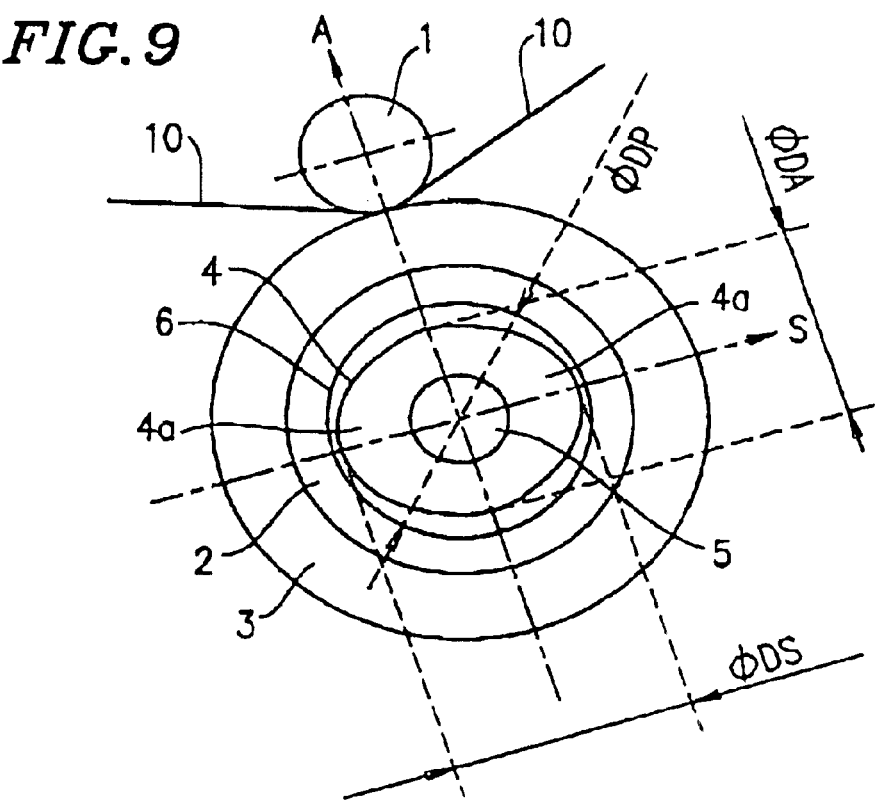
FIG. 9 is a cross-sectional view illustrating a structure modified from the pinch roller device shown in FIG. 2, taken along line C—C of FIG. 2.

FIG. 9 is a top cross-sectional view of the pinch roller device shown in FIG. 8 in the case where the center of the inclination restriction member 4 and the center of the bearing 11 are aligned with each other. Line A is a straight line connecting the center of the capstan shaft 1 and the center of the bearing 11. Namely, line A is extended in the tape thickness direction (arrow M in FIG. 2). Line S is a line which passes through the center of the bearing 11 perpendicularly to line A. Namely, line S is extended in the tape running direction. $\phi DS$ represents a length of the cross-section of the inclination restriction member 4 along line S, and $\phi DA$ represents a length of the cross-section of the inclination restriction member 4 along line A. $\phi DP$ represents a diameter of the sliding restriction member 6.

$$\text{In FIG. 9, } \phi DS > \phi DA \tag{3}$$

Figure 10:
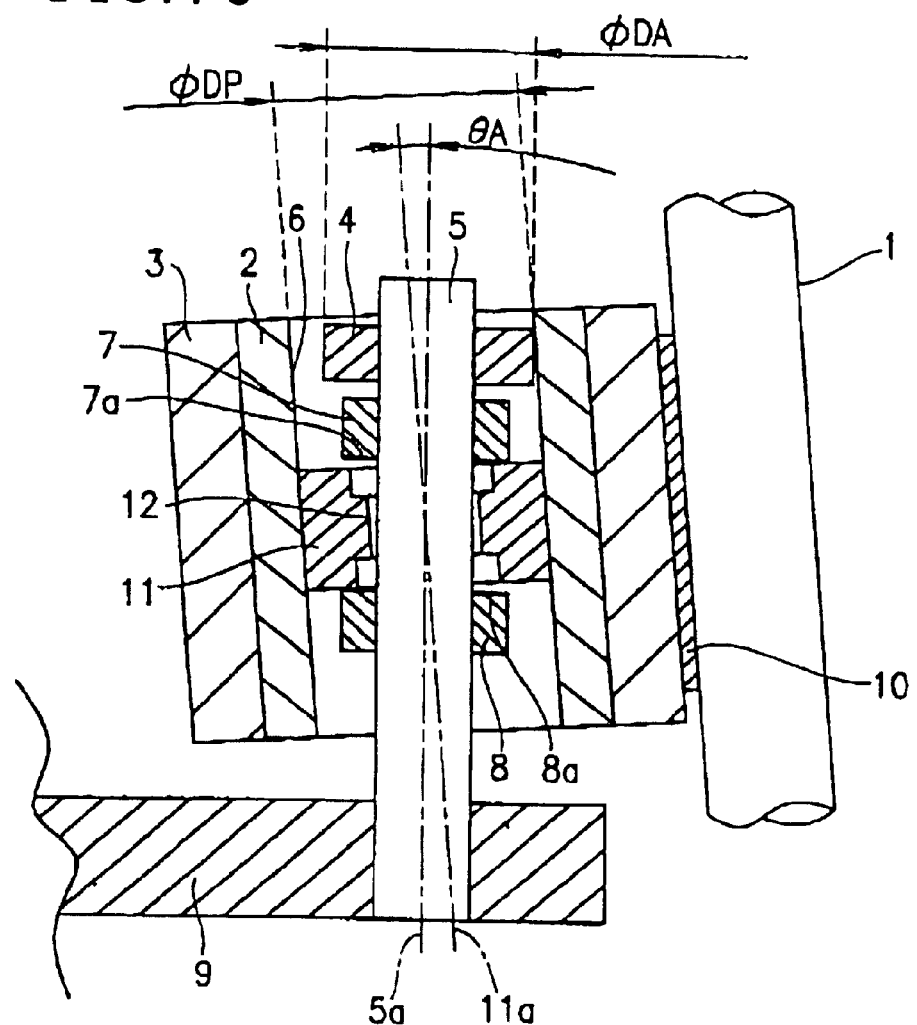
FIG. 10 is a cross-sectional view taken along line A of FIG. 9.
Figure 11:
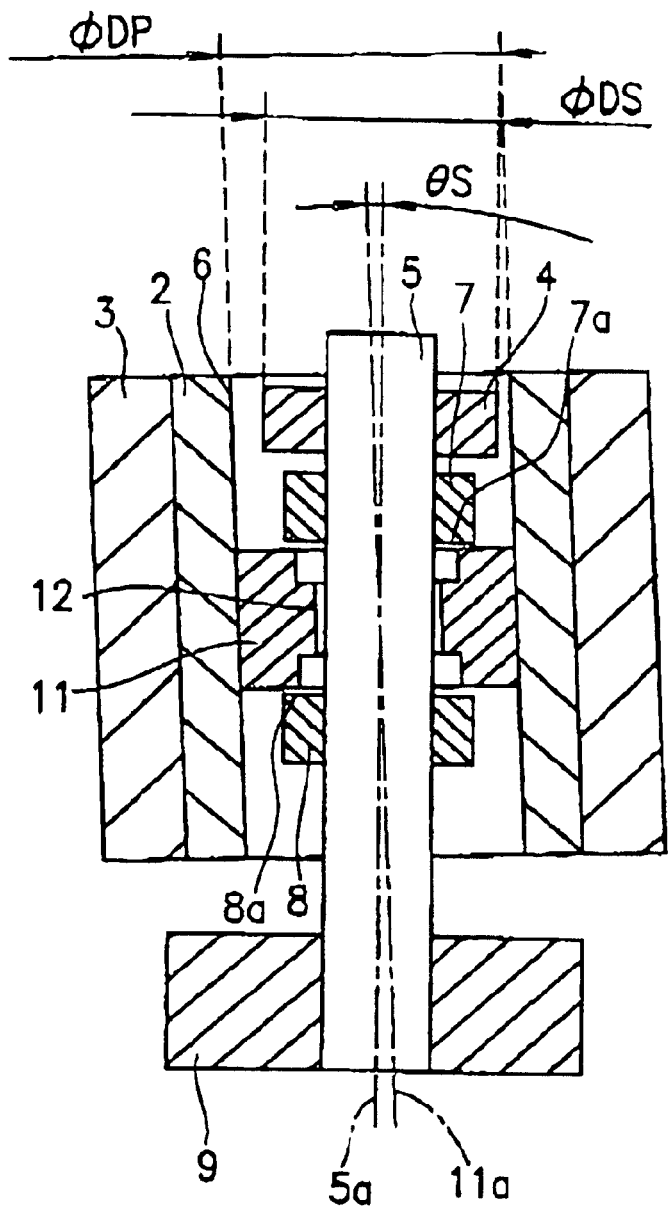
FIG. 11 is a cross-sectional view taken along line S of FIG. 9.

In this case, angle $\theta A$ defines the angle between the rotation center line 5a of the pinch roller shaft 5 and the rotation center line 11a of the bearing 11 in the tape thickness direction as shown in FIG. 10 when the inclination restriction member 4 contacts the sliding restriction member 6. Angle $\theta S$ defines the angle between the rotation center line 5a of the pinch roller shaft 5 and the rotation center line 11a of the bearing 11 in the tape running direction as shown in FIG. 11 when the inclination restriction member 4 contacts the sliding restriction member 6. Angles $\theta A$ and $\theta S$ have the relationship of:

$$\theta A > \theta S \tag{4}$$

In order to stably run the tape 10, the elastic member 3 needs to be put into uniform pressure-contact with the capstan shaft 1. Angle $\theta A$ in FIG. 10 should be set to equal to or greater than the error in the angle between the pinch roller shaft 5 and the capstan shaft 1. In order to accommodate for an error of angle between the pinch roller shaft 5 and the capstan shaft 1 along line S (FIG. 9), angle θA is preferably set to be a maximum possible value.

In the tape running direction represented by line S (FIG. 9), when the running direction of the tape 10 is changed from forward to rearward or from rearward to forward, the direction of inclination of the elastic member 3 is reversed. Where angle θS between the rotation center line 11a of the bearing 11 and the rotation center line 5a of the pinch roller shaft 5 is too large, the height of the tape 10 with respect to the surface of the capstan shaft 1 rapidly changes when changing the running direction of the tape 10 from forward to rearward or vice versa. This may damage the tape 10 or cause unstable running of the tape 10. Therefore, in the running direction of the tape 10, angle θS is preferably set to a minimum possible value.

In this example, angles θA and θS can each be set to an optimum value independently. This is advantageous in order to improve the precision of components, ease of assembly, and stability of tape running.

Figure 12:
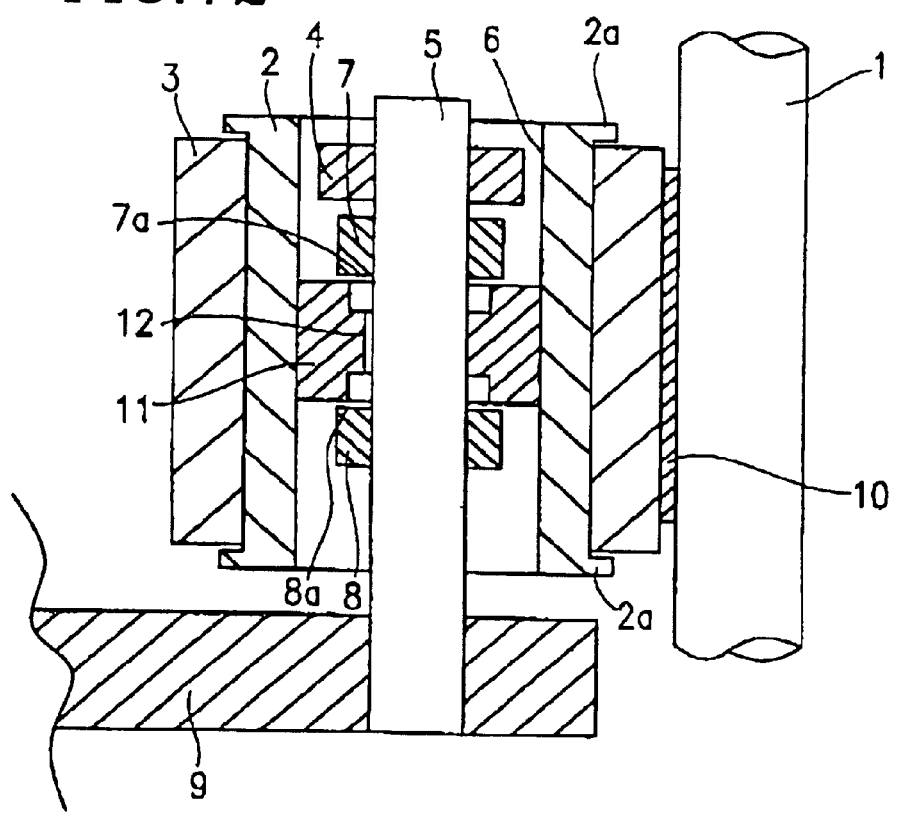
FIG. 12 is a cross-sectional view illustrating a structure modified from the pinch roller device shown in FIG. 1.

FIG. 12 is a cross-sectional view of a pinch roller device having still another structure modified from the pinch roller device 100 shown in FIG. 1. The elastic member 3 is fit into the sleeve 2 and held between projections 2a provided along top and bottom perimeters of the sleeve 2 so as not to come off. Conventionally, a rubber elastic element is often fixed to a metal sleeve by an adhesive or the like. The projections 2a of the sleeve 2 allow the elastic member 3 to be held in place even when the sleeve 2 is formed of a resin or the like, and eliminates the step of fixing the elastic member 3 to the sleeve 2 by an adhesive or the like. This is advantageous to simplify the production process of the pinch roller device and to enlarge the selection of the materials for the sleeve 2 and the elastic member 3. When the sleeve 2 is formed of a resin, the production cost of the sleeve 2 is reduced. When the sleeve 2 is formed of a material having low rigidity such as, for example, a resin material, the bearing 11 may be pressure-inserted into the sleeve 2 so as to be fixed.

Figure 13:
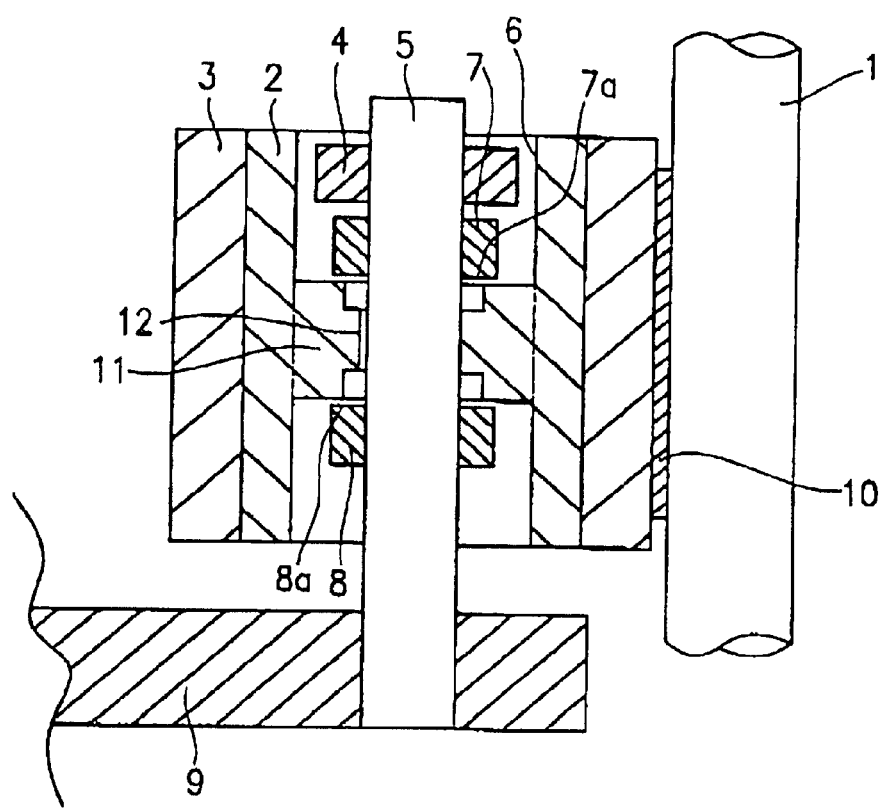
FIG. 13 is a cross-sectional view illustrating a structure modified from the pinch roller device shown in FIG. 1.

FIG. 13 is a cross-sectional view of a pinch roller device having still another structure modified from the pinch roller device 100 shown in FIG. 1. The sleeve 2 and the bearing 11 are integrated together and formed of an identical material. The pinch roller device having such a structure is easy to assemble and is produced easily and at lower cost.

As described above, according to the present invention, the angle between the rotation center line of the bearing and the rotation center line of the pinch roller shaft in the tape thickness direction and the above-mentioned angle in the tape running direction can each be appropriately set easily and independently. The strict control of the size of the gap between the pinch roller shaft and the effective bearing face required by the conventional pinch roller device is not necessary. Therefore, an error in the angle of inclination of the pinch roller shaft with respect to the capstan shaft in the tape thickness direction, which may be caused in the production process, is accommodated. The angle of inclination of the pinch roller shaft with respect to the capstan shaft in the tape running direction can be kept as small as possible so as not to rapidly change the height of the tape with respect to the surface of the capstan shaft, damage the tape, or cause unstable running of the tape.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A pinch roller device for putting a tape into pressure-contact with a capstan shaft for running the tape, the pinch roller device comprising:
   a hollow cylindrical elastic member rotating while the tape is running;
   a sleeve provided on an inner surface of the elastic member for holding the elastic member;
   a bearing integrated with the sleeve;
   a pinch roller shaft inserted through the bearing for rotatably supporting the bearing;
   an inclination restriction member integrated with the pinch roller shaft for restricting an angle of inclination of the pinch roller shaft with respect to the elastic member;
   a first position restriction member integrated with the pinch roller shaft to be inside the elastic member for restricting a position of the elastic member in a first thrusting direction of the elastic member;
   a second position restriction member integrated with the pinch roller shaft to be inside the elastic member for restricting a position of the elastic member in a second thrusting direction of the elastic member; and
   a sliding restriction member integrated with the sleeve and having a circular cross-section along a plane perpendicular to a rotation center line of the elastic member,
   wherein:
      the bearing has an effective bearing face in contact with an outer circumferential surface of the pinch roller shaft for receiving a force applied from the pinch roller shaft in a radial direction of the pinch roller shaft,
      the sliding restriction member is disposed at a different portion from the effective bearing face, a distance from a center of the effective bearing face in a direction of a center line of the bearing to a contact point between the inclination restriction member and the sliding restriction member is larger than at least either one of distances from the center of the effective bearing face in a direction of a center line of the bearing to the end face in a direction of the center line of the bearing which is a restricted position in a thrust direction of the first position restriction member and the second position restriction member, and
      when an angle between the rotation center line of the elastic member and a rotation center line of the pinch roller shaft approaches a prescribed value, the sliding restriction member contacts the inclination restriction member.

2. A pinch roller device according to claim 1, wherein one of the first position restriction member and the second position restriction member is integrated with the inclination restriction member.

3. A pinch roller device according to claim 1, wherein the inclination restriction member is formed of a resin material and pressure-inserted into the pinch roller shaft.

4. A pinch roller device according to claim 1, wherein the sliding restriction member has a cylindrical inner surface, the inner surface having a roughness equal to or less than 3 mm, and is pressure-inserted into the sleeve.

5. A pinch roller device according to claim 1, wherein the inclination restriction member is produced of an identical material as that of the pinch roller shaft as a result of partially enlarging the diameter of the pinch roller shaft.

6. A pinch roller device according to claim 1, wherein the pinch roller shaft projects from a pinch arm for supporting the pinch roller shaft, and a portion of the pinch arm acts as the inclination restriction member.

7. A pinch roller device according to claim 6, wherein the pinch arm is formed of a resin material, and the inclination restriction member is formed integrally with and of the same resin material.

8. A pinch roller device according to claim 1, wherein a cross-section of the inclination restriction member along a plane perpendicular to a rotation center line of the pinch roller shaft has a portion which extends radially outward from a perfect circle, and the portion extending radially outward is contactable with the sliding restriction member.

9. A pinch roller device according to claim 8, wherein qA>qS where qA is an angle between the rotation center line of the elastic member and the rotation center line of the pinch roller shaft in a tape thickness direction when the inclination restriction member contacts the sliding restriction member, and qS is an angle between the rotation center line of the elastic member and the rotation center line of the pinch roller shaft in a tape running direction when the inclination restriction member contacts the sliding restriction member.

10. A pinch roller device according to claim 1, wherein the bearing is pressure-inserted into the sleeve so as to be fixed.

11. A pinch roller device according to claim 1, wherein the elastic member is engaged with the sleeve and held by projections provided along top and bottom perimeters of the sleeve so as not to come off from the sleeve.

12. A pinch roller device according to claim 1, wherein the sleeve and the bearing are integrated together and formed of an identical material.

13. A pinch roller device according to claim 1, wherein LB<0.3 LG where LB represents a length of the effective bearing face in the direction of the rotation center line of the elastic member and LG represents a length of the elastic member in the direction of the rotation center line of the elastic member.

* * * * *